Dec. 28, 1943.   M. A. CROSBY   2,337,550
DIE CASTING-PLASTIC INJECTION METHOD OF MOLDING
Filed Aug. 21, 1939
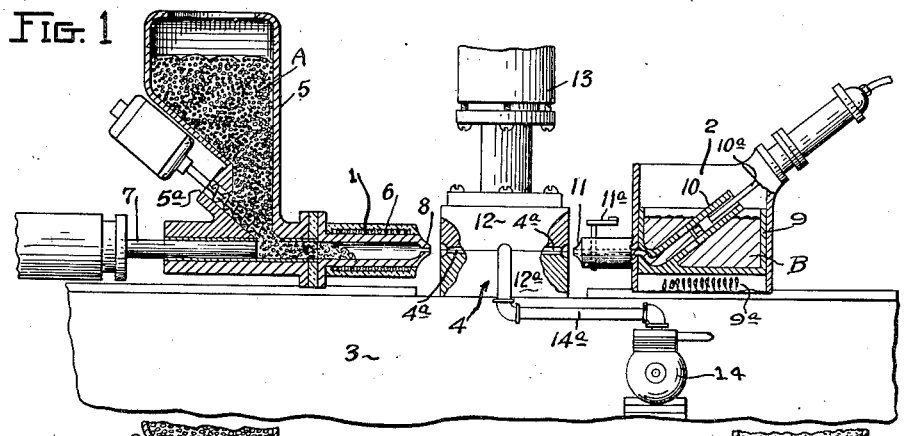
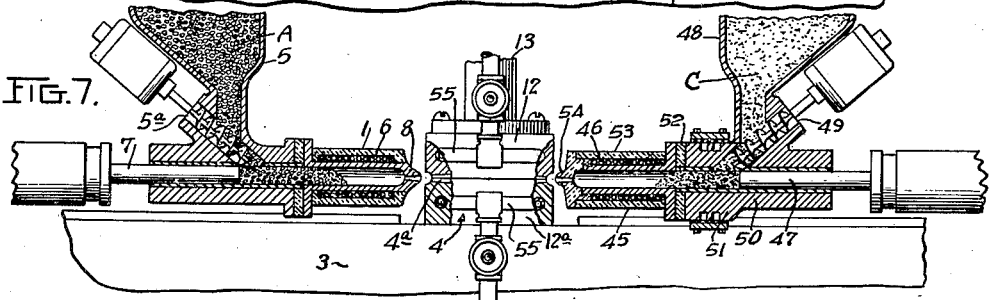
Inventor
MELVIN A. CROSBY
by
Attorneys Patented Dec. 28, 1943

2,337,550

UNITED STATES PATENT OFFICE 2,337,550

DIE CASTING-PLASTIC INJECTION METHOD OF MOLDING

Melvin A. Crosby, Dayton, Ohio, assignor to The Hydraulic Development Corp., Inc., Wilmington, Del., a corporation of Delaware Application August 21, 1939, Serial No. 291,137

9 Claims. (Cl. 18—59)

This invention relates to the manufacture of composite articles from moldable substances having different physical properties such as thermoplastic, thermosetting, metal and ceramic materials.

One object of this invention is to provide a method of forming composite products from thermoplastic and thermosetting materials.

Another object is to provide a method of making articles composed of both thermoplastic and thermosetting substances which is economical, efficient and is adapted for continuous production of molded articles.

Another object is to devise a process whereby materials of different physical properties can be injection molded simultaneously or successively into a mold cavity, heat treated and cooled to provide a composite molded product.

Another object is to provide a simplified method of making molded articles from thermoplastic and thermosetting materials by injection molding the materials while controlling the temperature so as to prevent setting of the thermosetting material prior to injection into the mold cavity.

Another object is to devise a method of injecting plastic material and moldable metal in a mold to produce a composite metal-plastic product in which the metal portion and plastic constituents are securely interlocked providing a strong durable article.

Another object is to provide a method of making composite articles from thermoplastic and thermosetting materials with or without the inclusion of moldable metal or ceramic constituents.

These and other objects and advantages will appear from the following description taken in connection with the accompanying drawing, in which:

Figure 1 is an elevation view, partly in section, illustrating a combined die casting and injection molding type machine which is utilized for producing articles by this invention;

Figure 2 is a sectional view taken through a die casting injection type mold illustrating the single stage production of a molded product;

Figures 3 and 4 show a similar sectional view of a mold wherein a two-stage removable core is imployed;

Figure 5 is a sectional view of a mold illustrating the injection molding and die casting of plastic and metal in a mold cavity whereby the plastic is superimposed on the die cast metal surface forming an integral plastic and metal article;

Figure 6 is a similar sectional view of a mold illustrating the shrinking of a molded plastic material around a metal die casting;

Figure 7 is an elevation view, partly in section, illustrating a combined injection molding mechanism for molding composite articles from thermoplastic and thermosetting materials.

General procedure

The production of composite molded articles by this invention comprises injection molding the different materials into the desired mold cavity portions to form an integral product. In this way molded articles comprising both plastic and metal or thermoplastic and thermosetting substances are pressure cast together in the same mold cavity. Articles comprising both plastic and metal constituent parts are produced in a single operation. This provides an improved process over the prior methods for making metal-plastic articles which involved inlaying, electro-deposition, metal spraying and the like.

Molding equipment and process

Referring to the drawing in detail, there is illustrated in Figure 1 a machine designed to pressure mold plastic material and metal simultaneously wherein a transfer injection cylinder 1 and pressure casting mechanism 2 are slidably mounted on a frame or base 3. The injection cylinder and die casting mechanism are arranged to be moved in contact with the mold member generally designated 4, during the injection of the plastic and metal material into the mold cavity 4a. Either molten metal or metal in the form of a paste or putty may be utilized. Further, in place of metal a fused ceramic material such as glass or porcelain compositions may be used.

In molding the composite article with the apparatus shown in Figure 1, thermoplastic material A is introduced into the hopper 5 and fed into the cylinder 1 by means of a suitable conveyor means 5a. The material is brought to a temperature at which it becomes soft and flowable in the injection cylinder 1 by means of the heater coil members 6. In place of electric heater coils, fluid heating or other suitable means may be utilized for this purpose.

When the material in the cylinder has reached a moldable state the injection cylinder 1 is moved in contact with the mold and the ram 7 reciprocated through the bore of the cylinder injecting the plastic material out through the nozzle 8 into the mold cavity 4a.

In like manner the metal or ceramic casting apparatus 2 is moved in contact with the mold so as to provide communication with the mold cavity and moldable metal or ceramic material B is injected into the adjacent sections of the mold cavity 4a. For pressure casting the metal material there is provided a vessel 9 for containing the molten metal or ceramic material which is to be injected into the mold cavity. Suitable means for heating the vessel 9 so as to maintain the material therein in a flowable state is provided for as at 9a. Within the vessel 9 is a cylinder 10 and piston 10a which is reciprocable in the bore of the cylinder and forces metal outward through the nozzle member 11 into the mold cavity. The nozzle 11 is provided with a cut-off valve 11a for controlling the flow of moldable material therethrough.

The mold 4 is made of sections or halves 12 and 12a which are arranged to be opened and closed by a suitable member 13 which preferably comprises a hydraulic press mechanism. Suitable gate and runner passageways are provided in the mold which permit communication with the mold cavity for injecting therein the metal and thermoplastic or thermosetting materials. In the molding of composite metal and plastic materials it is preferable to evacuate the mold cavity of air during the molding process. For this purpose a vacuum pump means 14 may be utilized having suitable pipe connections 14a in communication with the mold cavity. Where the metal and plastic materials are molded so as to become interlocked, evacuation of the mold cavity may be omitted.

In Figure 2 there is illustrated a mold comprising the halves 15 and 16 which form a mold cavity generally designated 17. The mold cavity is adapted to receive the moldable metal through the gate 18 and thermoplastic material by the gate 19. In this way a molded product having a plastic section 20 and metal portion 21 is provided made of combined plastic and metal material. The plastic and metal parts are preferably pressure molded simultaneously in this instance. To interlock the plastic material 20 and metal 21, a suitably shaped insert member 23 may be positioned in the mold as shown in Figure 2.

Figures 3 and 4 illustrate a combination mold for injection molding and casting articles composed of metal and plastic material wherein the mold is provided with a removable core 25. In this case there is a die or pressure molded metal section 26 which is formed with the core 25 in place as shown in Figure 4. Thereafter the core 25 is removed and an adapter inserted in its place and the thermoplastic or thermosetting material is injected into the remaining portion of the mold cavity as at 27.

Where desired the metal and thermoplastic material may be surface contacted together so as to provide an integral product by the use of a mold as shown in Figure 5. In this modification the metal 30 is forced or flowed by gravity into the lower portion of the mold cavity and the plastic material 31 injected or otherwise filled into the remaining portion of the mold cavity. Where the plastic is decomposed at the molding temperature of the metal or ceramic material, it will be understood that the material will be allowed to cool sufficiently before the thermoplastic is injected into the mold so as to prevent decomposition, scorching or discoloring of the plastic substance.

In Figure 6 there is shown a mold having three-way gate openings 32, 33 and 34 which is arranged to provide for shrinking plastic material onto a die cast metal portion. Removable cores 35 and 36 are used in this process. The cores are inserted in the mold, as shown in Figure 6, and the mold cavity filled with metal, for example by die casting or injecting the moldable metal through the gate 34 to fill the mold cavity portion which is to be formed of metal, as shown at 37. After the metal has solidified and cooled to the proper temperature the cores are partially withdrawn and the plastic material injected through the gates 32 and 33 between the mold halves so as to shrink the plastic material 38 over the surface of the metal part 37 and interlock it therewith as shown at 40.

Referring to Figure 7, there is shown a modification wherein an apparatus is disclosed for making composite molded articles from thermoplastic and thermosetting materials. In this instance an injection cylinder 1, similar to that illustrated in Figure 1, is employed for transferring thermoplastic material into the mold. For injection molding the thermosetting material into the mold cavity there is provided a modified injection molding mechanism having a cylinder 45 which is equipped with a heater coil means 46 and is provided with a snugly fitting ram 47 reciprocable in the bore of the cylinder for injecting thermosetting material from the cylinder into the mold cavity. In this mechanism the thermosetting material C is introduced into a hopper 48, and predetermined quantities thereof are moved into the cylinder by means of a feeding mechanism 49. The rearward portion 50 of the injection cylinder 45 is provided with suitable cooling means such as walls 51 through which cooling fluid may be circulated, and suitable insulating means 52 are interposed between the injection cylinder 45 and the rear portion 50 in order to maintain this part of the mechanism at relatively lower temperature than the cylinder 45.

The temperature within the cylinder 45 is carefully controlled so as to maintain the thermosetting material of soft plastic consistency, but not at a temperature high enough to bring about setting of the material to an infusible set. To this end the cylinder 45 is preferably constructed of an outer insulating layer 53, and the nozzle 54 is constructed of heat insulating material so as to prevent the conduction of heat from the mold 4 to the cylinder while the parts are in contact.

The mold 4 is provided with heating coils 55 which are arranged to carry a suitable heating fluid such as steam, hot water or oil so as to maintain the temperature of the mold sufficiently high to effect rapid setting of the plastic material after it has been injected in the mold cavity. It will be appreciated that in molding the composite thermoplastic and thermosetting articles the plastic material is confined in the mold cavity to form the desired shape under positive pressure, and is heated or cooled for a sufficient time to bring about hardening or setting of the molded part while so confined. In general pressures of around 5000 to 50,000 pounds per square inch are employed for the molding process.

Various materials, such as ethyl cellulose, cellulose acetate, acrylic, styrene, phenolic and urea plastics, or rubber material may be used as the thermoplastic and thermosetting substances. The addition of suitable fillers such as cellulose powder, pigment and the like may be incorporated in the resins and injection molded. Typical examples of metal which are adapted for pressure molding in this process are lead, zinc, tin, bismuth, etc. Further, high melting metals or alloys such as iron, aluminum, magnesium and copper may be used provided that the plastic material is not brought in contact with the highly heated metal until it has cooled sufficiently in the mold to prevent discoloration or decomposition of the plastic organic material utilized.

In general the organic plastic substances mentioned will be preliminarily heated to a soft flowable state at temperatures around 200 to 300 degrees F. while the mold for bringing about thermosetting of the plastic material is maintained at a temperature of from 350 to 450 degrees F. depending upon the particular plastic substance used. Before opening the mold, the pressure on the molded material is first released and preferably only the required amount of material for filling the mold cavity for any one operation is introduced into the injection cylinders. It will also be understood that for producing small parts the molds will be provided with multiple cavities to give the required rate of production.

The practical embodiments of this invention have been illustrated and described, but it is understood that this invention is not limited to the particular construction and process described, as it will be obvious to those skilled in the art that various changes may be made to suit varying conditions and uses.

Having thus fully described my invention, what I claim as new and desire to secure by Letters Patent is:

1. A method of molding plastic organic material and inorganic material to fabricate a composite product from organic plastic material and inorganic material which can be rendered flowable, comprising forcing an organic plastic material in a softened state into a mold cavity and forcing an inorganic material having a flow temperature which will not deleteriously affect the organic material in a flowable state into another portion of the mold cavity so that the materials will contact each other within the mold cavity while under pressure to coherently unite the materials and produce a composite molded product.

2. A method of molding plastic organic material and an inorganic material having a flow temperature sufficiently low as not to deleteriously affect the organic material when in contact therewith at the flow temperature, comprising pressure injection molding said plastic organic material and said inorganic material in a mold cavity bringing the materials into intimate contact under injection pressure to form a molded article comprising inorganic material and organic plastic material integrally united in a molded product.

3. In the method of fabricating molded articles from ceramic and organic plastic material comprising introducing molten ceramic material to partially fill a mold cavity lowering the temperature to a level which is not deleterious to an organic plastic, injecting plastic organic material in a softened state into said mold cavity and into contact with said ceramic material under injection pressure to produce a molded product comprising organic plastic and ceramic portions coherently united into a unitary structure.

4. In the method of molding products comprising metal and organic plastic material, the steps of die casting metal having a flow temperature sufficiently low as not to deleteriously affect organic plastic material and injection molding organic plastic material in a common mold cavity to bring the metal and plastic into intimate contact under casting and injection pressure to produce a composite article.

5. The method of making composite articles from thermoplastic and thermosetting materials comprising simultaneously injection molding said thermoplastic and thermosetting materials by introducing the same in a common mold cavity to bring the materials into intimate contact under injection pressure, maintaining the mold heated for sufficient time to effect setting of said thermosetting material, and cooling the mold to effect setting of the said thermoplastic material.

6. The method of forming articles of inorganic moldable and organic plastic compositions comprising providing a mold cavity of the desired shape and filling a portion of said cavity with inorganic material in a flowable state, cooling said inorganic material to at least partially solidify the same, subsequently injecting thermoplastic organic material of greater coefficient of expansion than said first named material into the remaining part of the mold cavity in such manner as to cause a portion of which organic material to surround a portion of the inorganic material, and cooling the materials to shrink the organic material upon the inorganc material.

7. In the method of fabricating molded articles from metal and organic plastic material comprising introducing molten metal into a portion of a mold cavity and cooling the metal to partially solidify the same to a level which is not deleterious to an organic plastic, injecting plastic organic material in a softened state into said mold cavity and into contact with said metal under injection pressure to produce a molded product comprising organic plastic and metal portions coherently united forming a unitary structure.

8. In a method of fabricating molded articles from ceramic and organic plastic material comprising forcing a ceramic material in a flowable state into a mold cavity to partially fill the same, cooling the ceramic material to a point where it will not deleteriously affect organic material, injecting plastic organic material in a softened state into said mold cavity and into contact with the ceramic material under injection pressure to produce a bond between the ceramic material and the plastic organic material to coherently unite the same into a composite structure.

9. In a method of fabricating molded articles from ceramic and organic plastic material comprising forcing a ceramic material in a flowable state into a mold cavity to partially fill the same, cooling the ceramic material to a point where it will not deleteriously affect organic material, injecting plastic organic material in a softened state into said mold cavity subsequent to the injection of ceramic material and into contact with the ceramic material under injection pressure to produce a bond between the ceramic material and the plastic organic material to coherently unite the same into a composite structure.

MELVIN A. CROSBY.